H. HOEL.
RAKE CLEANER.
APPLICATION FILED JUNE 30, 1916.
1,254,041. Patented Jan. 22, 1918.
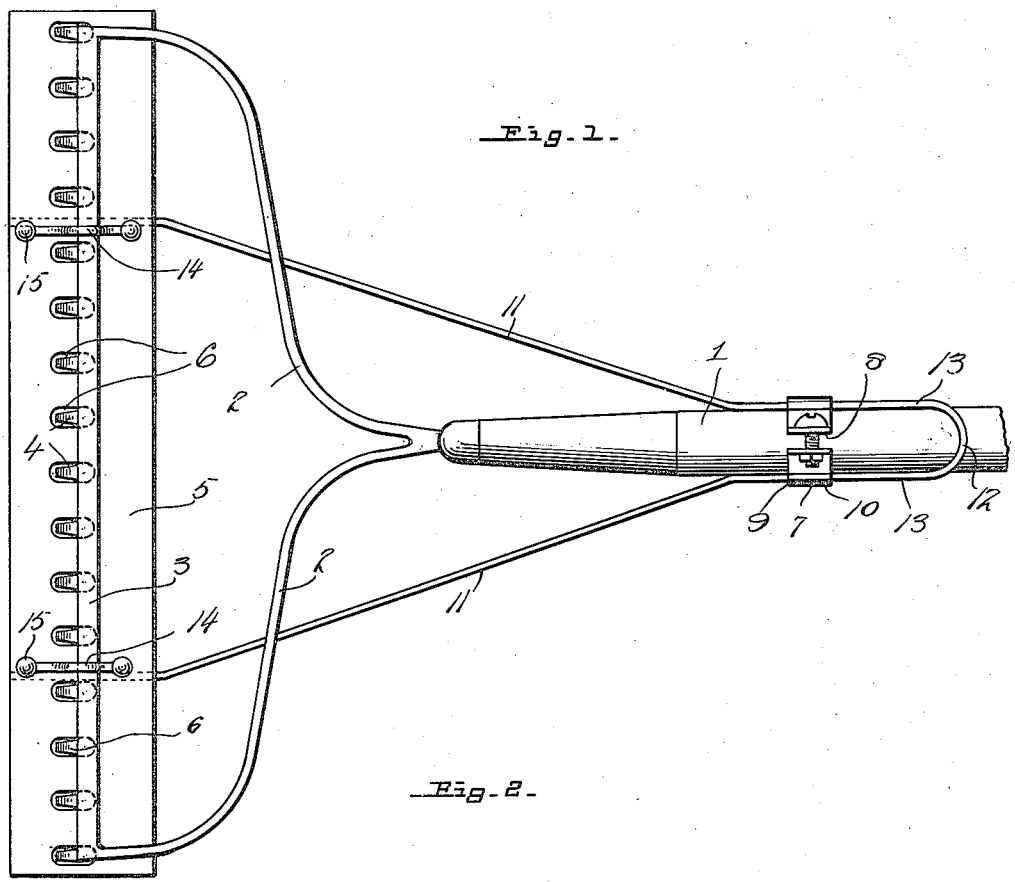
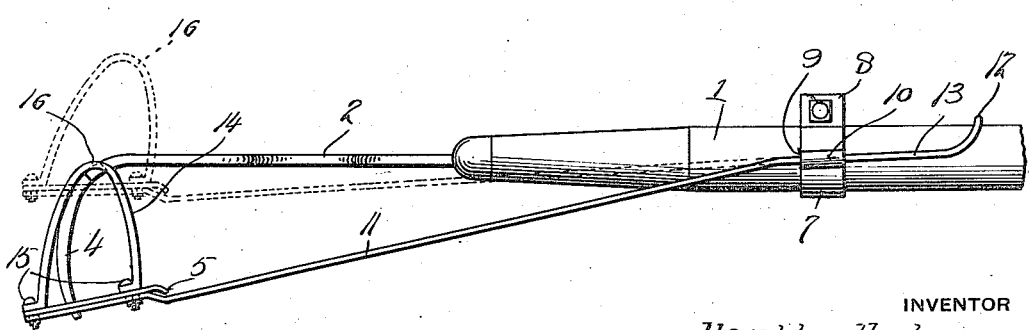
WITNESSES
INVENTOR
Harold Hoel.
ATTORNEY

UNITED STATES PATENT OFFICE.

HAROLD HOEL, OF CHRISTINE, NORTH DAKOTA.

RAKE-CLEANER.

1,254,041.　　　　　Specification of Letters Patent.　　Patented Jan. 22, 1918.

Application filed June 30, 1916. Serial No. 106,887.

*To all whom it may concern:*

Be it known that I, HAROLD HOEL, citizen of the United States, residing at Christine, in the county of Richland and State of North Dakota, have invented certain new and useful Improvements in Rake-Cleaners, of which the following is a specification.

This invention relates to rake cleaners and more particularly to an attachment for an ordinary garden rake for cleaning the tines thereof after the same have become clogged with refuse.

The primary object of the invention resides in the provision of a cleaning plate normally disposed at the upper ends of the tines of the rake and resiliently supported from the handle of the rake whereby the plate may be moved toward the ends of the tines for cleaning the same.

The invention also aims to provide a device of this character which may be operated by simply inverting the rake and pressing a pair of yokes, carried by a cleaning plate, upon the ground without the necessity of the operator removing his hands from the handle of the rake, the pressure of the yoke upon the plate causing the same to move toward the free ends of the times and to move back into normal position when the pressure is released.

A further object of the invention is to provide an attachment for cleaning the tines of a rake which may be attached to any rake through the medium of a fastening element clamped to the handle of the rake.

The above and additional objects are accomplished by such means as are illustrated in the preferred embodiment and in the accompanying drawings, wherein like characters denote like or corresponding parts throughout the several views, in which:—

Figure 1 is a plan view showing the cleaning attachment mounted upon a rake.

Fig. 2 is an end elevation showing the attachment in normal position by dotted lines and in extended position in full lines.

The handle 1 carries at one of its ends, the supporting rods 2 to which is connected the tine bar 3 having a plurality of depending tines 4 connected thereto. A rectangular plate 5 of a length slightly greater than the length of the tine bar 3 is provided with a plurality of transverse slots 6 through which the tines 4 are projected so that the plate assumes the position shown by dotted lines in Fig. 2.

A clamp 7 is constructed of strap iron or any other suitable material and is provided with upstanding flanges 8 having apertures through which a fastening bolt is extended for fastening the clamp securely to the handle 1. The opposite sides of the clamp are provided with interior channels 9 formed by bending a portion of the clamp into a substantially semi-circular bent-out portion 10. For supporting the cleaning plate 5 in normal position, I provide a retaining member 11 constructed of spring steel or heavy wire and formed at one end into a yoke 12 to provide the side arms 13 which are extended through the channels 9 of the clamp. Forwardly of the clamp the wire is bent outwardly at an angle from the handle and the free ends of the wire are then secured to the bottom face of the plate 5.

An operating yoke 14 is formed of a loop of wire and its ends are secured to the plate 5 by the fastening elements 15 and, when the attachment is in normal position as shown by dotted lines in Fig. 2, the upper end 16 of the yoke will be disposed considerably above the upper ends of the tines.

For cleaning the rake, the operator may simply place his hand upon the upper end 16 of the operating yoke and apply a pressure thereto for moving the plate along the tines 4 thereby causing any refuse that may adhere to the tines to be moved therefrom. Or the operator may simply invert the rake and, by retaining his hold of the handle and pressing the ends of the operating yokes upon the ground, the plate will be moved along the tines for cleaning the tines and, by virtue of the resiliency of the spring wire 11, the plate will spring back to normal position as soon as the pressure has been released therefrom.

I claim:

The combination with a rake, of a cleaning element including a substantially rectangular plate having a plurality of openings therein to receive the tines of the rake, operating yokes mounted upon the plate near the ends thereof and extending over the tine bar of the rake, the said yokes each including a loop of wire having its terminals fixed to the top of the plate, a support for the said plate including a single strand of wire formed with a yoke intermediate its ends, to embrace the handle of the rake at opposite sides of the handle, the terminals of the wire in the said support being fixed to the bottom of the plate, the top of the said operating yoke being engageable with the tine bar of the rake when the plate is moved to the end of the tine, and means for fixing the said yoke to the handle of the rake.

In testimony whereof I affix my signature in presence of two witnesses.

HAROLD HOEL.

Witnesses:
O. J. STRAND,
R. W. EGO.